No. 791,269. PATENTED MAY 30, 1905.
G. J. KAPLAN.
COMBINED CHURN AND BUTTER WORKER.
APPLICATION FILED OCT. 3, 1904.

WITNESSES
O. G. Hanson
C. Macnamara

INVENTOR
GODFREY J. KAPLAN
BY
Paul & Paul
HIS ATTORNEYS

No. 791,269.

Patented May 30, 1905.

UNITED STATES PATENT OFFICE.

GODFREY J. KAPLAN, OF OWATONNA, MINNESOTA, ASSIGNOR TO SANFORD G. KINNEY, OF OWATONNA, MINNESOTA.

COMBINED CHURN AND BUTTER-WORKER.

SPECIFICATION forming part of Letters Patent No. 791,269, dated May 30, 1905.

Application filed October 3, 1904. Serial No. 226,892.

*To all whom it may concern:*

Be it known that I, GODFREY J. KAPLAN, of Owatonna, in the county of Steele, State of Minnesota, have invented certain new and useful Improvements in a Combined Churn and Butter-Worker, of which the following is a specification.

This invention relates to improvements in combined churns and butter-workers; and the objects I have in view are to provide a simple and inexpensive machine which can be used for churning and in which after the churning is done the butter can be quickly worked.

The invention consists generally in the constructions and combinations hereinafter described, and particularly pointed out in the claims.

Figure 1:
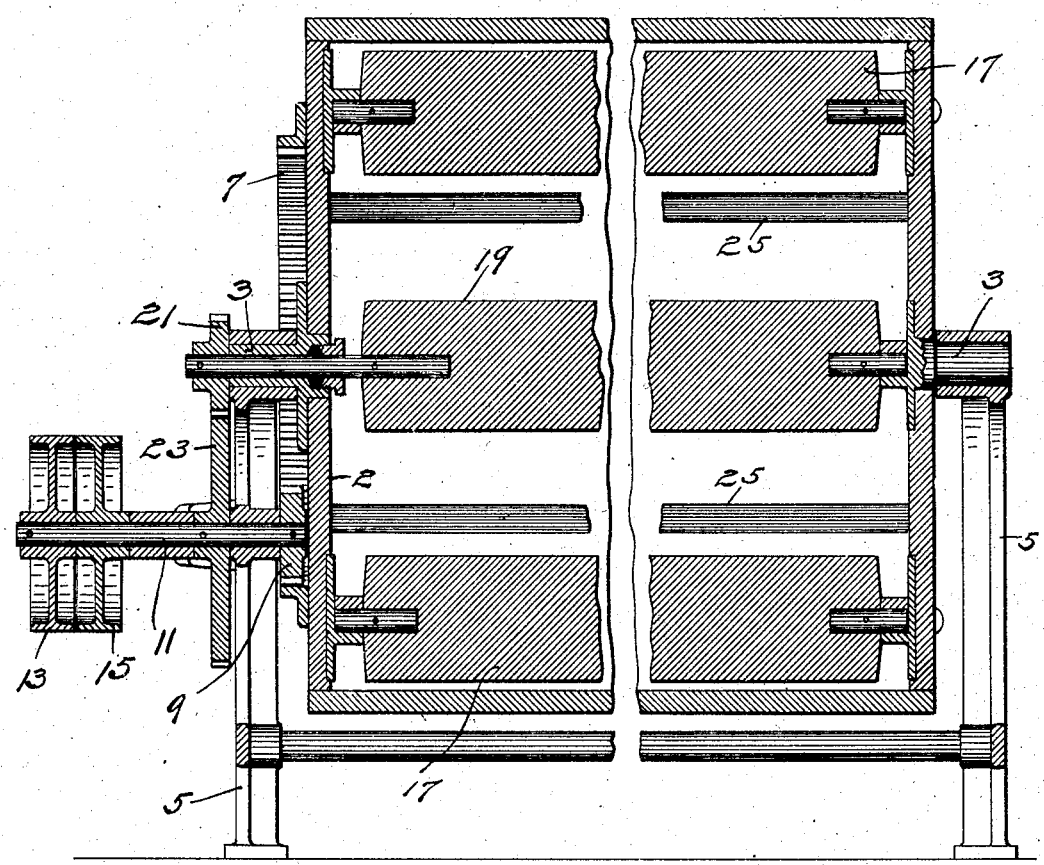
Figure 2:
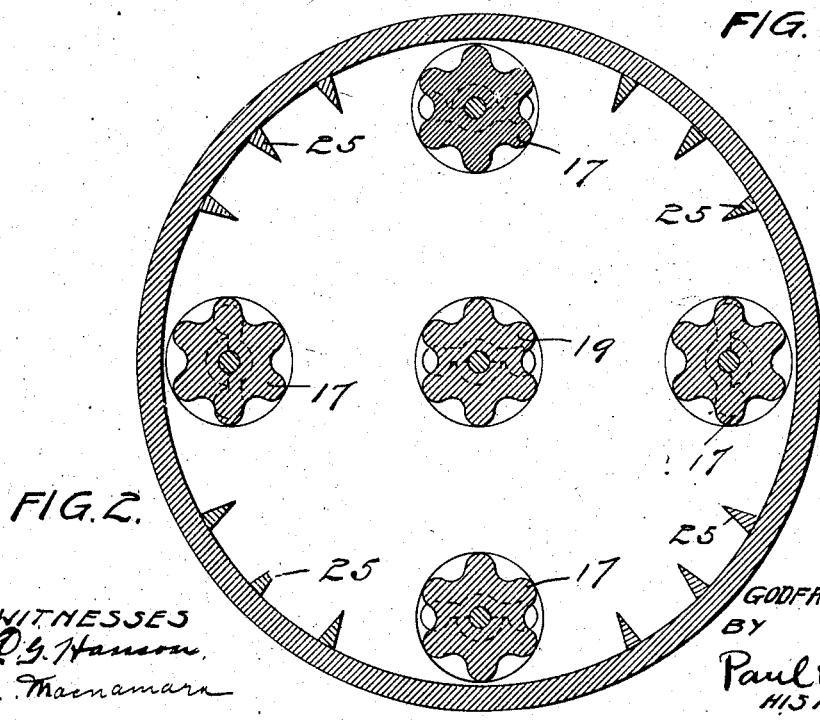

In the accompanying drawings, forming part of this specification, Figure 1 is a longitudinal section, partly broken away, of a combined churn and butter-worker embodying my invention. Fig. 2 is a transverse section of the same.

In the drawings, 2 represents the drum of the machine, which may be of any suitable size, shape, or construction. It is provided at its ends with the gudgeons 3, which are mounted in bearings in a suitable frame 5. One end of the drum is provided with a suitable ring-gear 7, which may be driven by a pinion 9 on a driving-shaft 11. This shaft is mounted in suitable bearings on the frame of the machine and is provided with the fast and loose pulleys 13 and 15.

Arranged within the drum, close to the wall thereof, are the idler-rollers 17. Any number of these rollers may be employed, located singly close to the wall of the drum. These rollers are preferably fluted longitudinally and arranged parallel to the axis of the drum. They are free to turn on their axes, but are so close to the wall of the drum as to prevent the butter from passing between them. I have shown in the present drawings four of the rollers 17; but a greater or less number may be used, as preferred. I also employ a central roller 19. As here shown, the gudgeon of this roller at one end extends through the gudgeon 3 of the drum and is provided with a pinion 21, engaged by a gear 23 on the shaft 11. By this means the roller 19 will be positively rotated. Any other suitable arrangement of gearing may be employed for driving the central roller, or the driving means may be omitted and this roller be an idler, like the rollers 17.

Flights 25 may, if preferred, be arranged upon the inner surface of the drum between the rollers 17.

In operation the rollers 17 act as roller shelves or flights to carry the butter up as the drum rotates and dump it so that it falls onto the central roller. The butter remains on the roller-shelves until it reaches a point considerably above the center of the drum. Then the weight of the butter causes the roller-shelf to turn, and the butter is thrown off and falls onto the central roller and then, being thrown off from the central roller, falls to the bottom of the drum, to be taken up by the next roller-shelf. When the machine is being used for churning, the roller-shelves 17 serve to agitate the cream, and thereby expedite the churning process.

Provision will usually be made for rotating the drum at different speeds in churning and butter-working.

I claim as my invention—

1. A combined churn and butter-worker comprising, in combination, a revoluble drum, a series of idler-rollers arranged within the drum and in proximity to its inner surface and constituting roller shelves or flights, and means for rotating the drum.

2. A combined churn and butter-worker comprising, in combination, a revoluble drum, a series of revoluble roller-shelves arranged within the drum in proximity to its inner surface, a central roller, and means for rotating the drum.

3. A combined churn and butter-worker comprising, in combination, a revoluble drum, a series of revoluble roller-shelves arranged within the drum in proximity to its inner surface, a central roller, means for rotating the central roller, and means for rotating the drum.

In witness whereof I have hereunto set my hand this 26th day of January, 1904.

GODFREY J. KAPLAN.

In presence of—
F. A. DUNHAM,
L. A. DISBROW.